United States Patent [19]

Mikawa et al.

[11] Patent Number: 5,367,033
[45] Date of Patent: Nov. 22, 1994

[54] BIODEGRADABLE ETHYLENE POLYMER HAVING ESTER BONDS IN THE MAIN CHAIN AND PROCESS FOR PRODUCTION OF THE SAME

[75] Inventors: Naohiro Mikawa; Satoshi Ueki; Naomi Koyama; Hiroyuki Furuhashi; Tetsuya Morioka; Shigeyuki Toki, all of Saitama, Japan

[73] Assignee: Tonen Corporation, Tokyo, Japan

[21] Appl. No.: 8,838

[22] Filed: Jan. 25, 1993

Related U.S. Application Data

[62] Division of Ser. No. 761,241, Sep. 17, 1991, abandoned.

[51] Int. Cl.⁵ .............................................. C08G 63/12
[52] U.S. Cl. .................................... 525/343; 525/353; 525/359.1; 525/386; 528/272; 528/279; 528/293
[58] Field of Search ............... 528/272, 290, 279, 293; 525/343, 353, 359.1, 386

[56] References Cited

U.S. PATENT DOCUMENTS 2,589,687  3/1952  Flory .................................... 528/272
2,801,189  7/1957  Collier ................................. 528/272

Primary Examiner—Christopher Henderson
Attorney, Agent, or Firm—Wenderoth, Lind & Ponack

[57] ABSTRACT

An ethylene polymer which is capable of being degraded by microorganisms is provided which comprises a recurring unit represented by the general formula

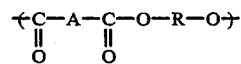

or

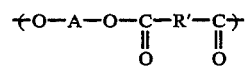

in which R is a divalent hydrocarbon group containing 2 to 20 carbon atoms, R' is a divalent hydrocarbon group containing 1 to 20 carbon atoms and A is a polyethylene segment comprising a recurring unit represented by the formula $+CH_2.CH_2+$ and having a number average molecular weight ($\overline{Mn}$) of 300 to 300,000, and the ethylene polymer having a number average molecular weight ($\overline{Mn}$) of 500 to 5,000,000.

21 Claims, No Drawings

BIODEGRADABLE ETHYLENE POLYMER HAVING ESTER BONDS IN THE MAIN CHAIN AND PROCESS FOR PRODUCTION OF THE SAME

This application is a division of now abandoned application Ser. No. 07/761,241, filed Sep. 17, 1991 now abandoned.

BACKGROUND OF THE INVENTION

1. Field of the Invention

This invention relates to a biodegradable ethylene polymer having ester bonds in the main chain and a process for the production of the same.

2. Description of the Prior Art

Polyethylene can be degraded by microorganisms if the molecular weight thereof is low. It is known that an ester bond in a molecule is hydrolyzed by microorganisms.

In order to render biodegradable a polyethylene of high molecular weight, it is known to mix the polyethylene with starch, etc. In this method, however, starch, etc. are degraded, but the polyethylene itself is not degraded.

SUMMARY OF THE INVENTION

It is all object of the present invention to provide a biodegradable ethylene polymer.

It is another object of the present invention to provide a polyethylene which is capable or being degraded by microorganisms.

These objects can be attained by all ethylene polymer comprising a recurring unit represented by the general formula

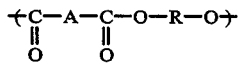

or

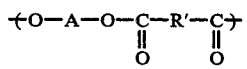

in which R is a divalent hydrocarbon group containing 2 to 20 carbon atoms, R' is a divalent hydrocarbon group containing 1 to 20 carbon atoms and A is a polyethylene segment comprising a recurring unit represented by the formula $-(CH_2.CH_2)-$ and having a number average molecular weight ($\overline{Mn}$) of 300 to 300,000, and the ethylene polymer having a number average molecular weight ($\overline{Mn}$) of 500 to 5,000,000.

DETAILED DESCRIPTION OF THE INVENTION

Based on the above described knowledge, the inventors have made various studies from the standpoint that the objects of the present invention can be attained by provision of a polymer comprising ester bonds in the skeleton and a polyethylene segment or a relatively low molecular weight, and consequently, have found that the object polymer of the present invention call be obtained by polycondensation of an ethylene polymer having carboxyl groups, hydroxyl groups or derivatives thereof at both the ends with a diol compound, dicarboxylic acid or derivatives thereof respectively. The present invention is thus accomplished Accordingly, the present invention provides all ethylene polymer comprising a recurring unit represented by the general formula

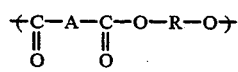

or

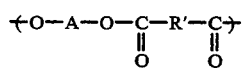

in which R is a divalent hydrocarbon group containing 2 to 20 carbon atoms, R' is a divalent hydrocarbon group containing 1 to 20 carbon atoms and A is a polyethylene segment comprising a recurring unit represented by the formula $-(CH_2.CH_2)-$ and having a number average molecular weight ($\overline{Mn}$) of 300 to 300,000, and the ethylene polymer having a number average molecular weight ($\overline{Mn}$) of 500 to 5,000,000, and a process for the production of the above described ethylene polymer comprising polycondensation of an ethylene polymer (I) or (I') respectively comprising a recurring unit represented by $-(-CH_2.CH_2-)-$ and having

group or X'O— group at both the ends and an Mn of 300 to 300,000 respectively with a compound (II) or (II') respectively represented by the general formula YO—R—OY or

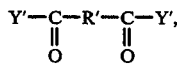

in which X is —OH, —OR$^1$, a halogen atom or —SO$_3$R$^2$, X' is a hydrogen atom, —SiR$^{1'}{}_3$ or

Y is a hydrogen atom, —SiR$^3{}_3$ or

Y' is —OH, —OR$^{3'}$, a halogen atom or —SO$_3$R$^{4'}$, R' is a hydrocarbon group containing 1 to 5 carbon atoms, R$^2$ is a hydrocarbon group containing 1 to 20 carbon atoms, R$^3$ and R$^4$ are hydrocarbon groups each containing 1 to 5 carbon atoms, R$^{1'}$, R$^{2'}$ and R$^{3'}$ are hydrocarbon groups each containing 1 to 5 carbon atoms, R$^{4'}$ is a hydrocarbon group containing 1 to 20 carbon atoms and R or R' has the same meaning as described above.

Ethylene Polymer

The ethylene polymer of the present invention is represented by the above described recurring unit. In the above described recurring units, R represents a divalent hydrocarbon group of 2 to 20 carbon atoms, preferably a divalent saturated or unsaturated aliphatic or alicyclic hydrocarbon of 2 to 12 carbon atoms and R' represents a divalent hydrocarbon group of 1 to 20 carbon atoms, preferably a saturated or unsaturated aliphatic or alicyclic hydrocarbon group of 1 to 12 carbon atoms.

"A" in the recurring unit consists of a polyethylene segment having a number average molecular weight ($\overline{Mn}$) of 300 to 300,000, preferably at most 100,000, in particular, at most 10,000 from the standpoint of the biodegradable property. The ethylene polymer of the present invention has an $\overline{Mn}$ of 500 to 5,000,000, preferably 1,000 to 500,000.

The ethylene polymer of the present invention can be produced by polycondensation of the foregoing ethylene polymer (I) with the compound (II), or of the ethylene polymer (I') with the compound (II').

The ethylene polymer (I) or (I') respectively comprises a recurring unit of $-(CH_2.CH_2)-$ and respectively having

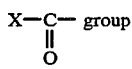 group or X'O— at both the ends and an $\overline{Mn}$ of 300 to 300,000, preferably at most 100,000, particularly at most 10,000 from the standpoint or the biodegradable property.

In the above described group, X is —OH, —OR$^1$, a halogen atom or —SO$_3$R$^2$ and X' is a hydrogen atom, —SiR$^{1'}_3$ or

R' in OR$^1$ is a hydrocarbon group containing 1 to 5 carbon atoms, preferably an alkyl group, more preferably methyl or ethyl group. The halogen atoms include chlorine, bromine, fluorine and iodine. R$^2$ in —SO$_3$R$^2$ is a hydrocarbon group containing 1 to 20 carbon atoms, specifically an alkyl group, alkenyl group, cycloalkyl group, aryl group or aralkyl group containing 1 to 20 carbon atoms. Above all, aryl groups and aralkyl groups are preferable. R$^2$ can be combined with a halogen atom such as chlorine, bromine, iodine or fluorine.

Examples of —SO$_3$R are as follows:

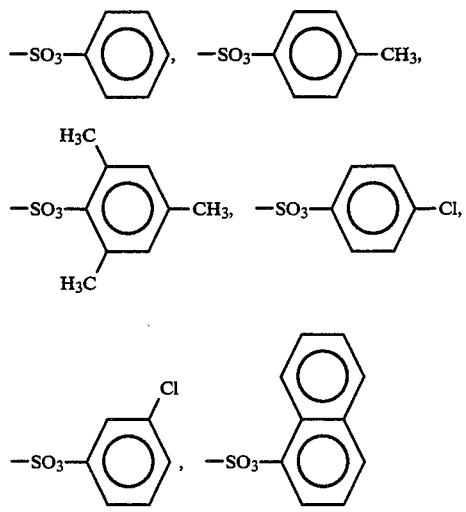

X is preferably —OH, —OCH$_3$, —OC$_2$H$_5$, —Cl or

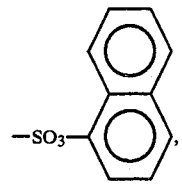

more preferably —OH or —OCH$_3$.

R$^{1'}$ and R$^{2'}$ are hydrocarbon groups containing 1 to 5 carbon atoms, preferably alkyl groups, more preferably methyl and ethyl groups.

Production of Ethylene Polymer (I)

An ethylene polymer (I) such that X is —OH or —SO$_3$R$^2$ can be produced by the following method.

Ethylene is polymerized in the presence of a dilithio compound formed by reaction of a diolefin compound (III) represented by the general formula, H$_2$C=CR$^3$—R$^4$—CR$^3$=CH$^2$ wherein R$^3$ is a hydrocarbon group containing 1 to 10 carbon atoms and R$^4$ is a divalent hydrocarbon group containing 1 to 20 carbon atoms, with an organolithium compound (IV), and a diamine compound (V), then reacted with carbon dioxide and further reacted with a proton donor or sulfonyl halide represented by the general formula ZSO$_2$R$^2$ wherein Z is a halogen atom and R$^2$ has the same meaning as described above.

Another ethylene polymer (I) such that X is —OR$^1$ or a halogen atom can be produced by the following method.

Ethylene is polymerized in tile presence of a dilithio compound formed by reaction of the above described diolefin compound (III) with the organolithium compound (IV), and a diamine compound (V), then reacted with carbon dioxide, further reacted with a proton donor and thereafter reacted with an alcohol represented by tile general formula R$^1$OH wherein R$^1$ has the same meaning as described above or thionyl halide.

(1) Reaction of Diolefin Compound (III) with Organolithium Compound (IV)

The diolefin compound (III) is represented by the general formula, H$_2$C=CR$^3$——R$^4$—CR$^3$=CH$_2$. In this formula, R$^3$ is a hydrocarbon group containing 1 to 10 carbon atoms, illustrative of which are alkyl, cycloalkyl, aryl and aralkyl groups, preferably alkyl and aryl groups. Examples thereof are alkyl groups such as methyl, ethyl, propyl, butyl, hexyl groups, etc. and aryl groups such as phenyl, tolyl, xylyl groups, etc.

R$^4$ is a divalent hydrocarbon group containing 1 to 20 carbon atoms, for example, substituents such as —CH$_2$.CH$_2$— wherein m=1 to 12 and

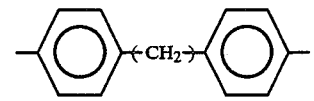

wherein r=1 to 6.

Examples of the compound (III) are 2,5-dimethyl-1,5-hexadiene, 2,5-diphenyl-1,5-hexadiene, 2,6-diphenyl-1,6-heptadiene, 2,7-diphenyl-1,7-octadiene, 2,7-di(4-toluyl)-1,7-octadiene, 2,7-dimethyl-1,7-octadiene, 1,2-bis[4-(1-phenylvinyl) phenyl]ethane, 1,4-bis[4-(1-phenylvinyl)phenyl]butane, 1,2-bis(isopropenyl-4- phenyl)ethane, 1,2-bis(isopropenyl-4-phenyl)butane and the like.

The organolithium compound (IV) is a compound represented by the general formula $R^5Li$, in which $R^5$ is a hydrocarbon group containing 1 to 10 carbon atoms, preferably alkyl groups and aryl groups, more preferably alkyl groups.

As the compound (IV), for example, there are used methyllithium, ethyllithium, n-propyllithium, i-propyllithium, n-butyllithium, i-butyllithium, s-butyllithium, t-butyllithium, n-phenyllithium, hexyllithium and the like.

The reaction of the compound (III) and the compound (IV) is preferably carried out in the presence of an organic solvent. As the organic solvent, there are preferably used hydrocarbons, in particular, aliphatic hydrocarbons such as heptane, hexane and the like and aromatic hydrocarbons such as benzene, toluene and the like. Two or more organic solvents can be used.

The compound (III) and the compound (IV) are used in a (IV)/(III) molar ratio of 0.1 to 30, preferably 1 to 5. Both the compounds are reacted at $-50°$ C. to $+100°$ C., preferably $0°$ to $50°$ C. for 1 hour to 1 month, preferably 1 day to 10 days.

(2) Polymerization of Ethylene

The polymerization of ethylene is carried out in the presence of a dilithio compound formed by the reaction of the compounds (III) and (IV) as described in the above described (1) and a diamine compound (V).

The diamine compound (V) is represented by the general formula, $R_2^6N-R^7-NR_2^6$ wherein $R^6$ is a hydrocarbon group of 1 to 5 carbon atoms, preferably alkyl group, illustrative of which are methyl, ethyl, n-propyl, i-propyl, n-butyl, i-butyl, s-butyl, t-butyl, n-pentyl and the like, methyl group being particularly preferable, and $R^7$ is a divalent hydrocarbon group of 1 to 10 carbon atoms, preferably a divalent hydrocarbon group represented by the general formula $-C_tH_{2t}-$ wherein $t=1$ to 10.

Examples of the compound (V) are tetramethylethylenediamine, tetramethylpropylenediamine, tetramethyldiaminobutane, tetramethyldiaminopentane, tetramethyldiaminohexane, tetramethylethylenediamine and the like.

The polymerization of ethylene is preferably carried out in the presence of a solvent such as hydrocarbons, more preferably aromatic hydrocarbons such as benzene, toluene, xylene and the like.

The ratio of the dilithio compound and diamine compound (V) used is 0.1 to 20 moles, preferably 0.5 to 4 moles of the diamine compound (V) to 1 mole of the diolefin compound (III).

The polymerization of ethylene is generally carried out at a temperature of $-100°$ C. to $+100°$ C., preferably $-30°$ C. to $+30°$ C. for 1 hour to 1 month, preferably 10 hours to 1 week.

(3) Reaction with Carbon Dioxide

The reaction of the ethylene polymer formed in the above described (2) with carbon dioxide is generally carried out by feeding carbon dioxide to the reaction system of the above described (2) and bringing into contact with the polymer. The carbon dioxide is present in a proportion of 0.1 to 10,000 moles, preferably 2 to 100 moles to 1 mole of the diolefin compound (I). The carbon dioxide can be fed in the form of a mixture containing carbon dioxide.

The reaction is generally carried out by feeding carbon dioxide at a relatively low temperature, i.e. $-150°$ C. to $+50°$ C., preferably $-100°$ C. to $0°$ C. and then contacting them at a temperature of $-50°$ C. to $+100°$ C., preferably 0 to $50°$ C. for 0.1 to 100 hours, preferably 1 to 10 hours, for example, by employing stirring means, etc.

(4) Reaction with Proton Donor or Sulfonyl Halide

As the proton donor, there can be used water, alcohols, inorganic acids, etc. The alcohols include methanol, ethanol, propanol and the like and the inorganic acids include hydrochloric acid, nitric acid, sulfuric acid, and the like.

The sulfonyl halide is represented by the general formula, $ZSO_2R^2$ in which Z is a halogen atom such as chlorine, bromine, fluorine or iodine. $R^2$ in, this formula have the same meaning as $R^2$ in a case where the substituent X of the foregoing ethylene polymer is $-SO_3R^2$.

The reaction with the proton donor or sulfonyl halide is generally carried out at $-100°$ C. to $+200°$ C., preferably 0 to $150°$ C. for 1 minute to 10 hours, preferably 0.1 to 2 hours.

The ethylene polymer (I) of the present invention, in which

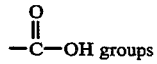

are introduced into both the ends thereof, is obtained by the reaction with the proton donor and that having

introduced into both the ends thereof is obtained by the reaction with the sulfonyl halide.

(5) Reaction with Alcohol or Thionyl Halide

The alcohol to be used is represented by the general formula, $R^1OH$ in which $R^1$ has the same meaning as described above. Thus, the particularly preferable alcohol is methanol or ethanol. As the thionyl halide, there can be used $SOCl_2$, $SO_2Cl_2$, $SOBr_2$, $SOI_2$ and the like.

The reaction with the alcohol or thionyl halide is generally carried out at $-50°$ C. to $+200°$ C., preferably $50°$ to $150°$ C. for 1 minute to 1 week, preferably 1 hour to 1 day. The alcohol can either be used individually or in the form of an alcohol complex such as methanol.$BF_3$ complex.

The ethylene polymers (I) of the present invention, in which

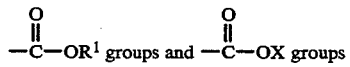

(X is a halogen atom) are respectively introduced into both the ends thereof, can be produced by reacting the product, obtained by reaction with the proton donor in the above described (4), respectively with the alcohol and with the thionyl halide.

It can be assumed that the polymer (I) of the present invention, obtained in this way, has the following microstructure containing the skeleton of the diolefin compound and the substituent $R^5$ of the organolithium compound used in the production, because of adopting the above described production process.

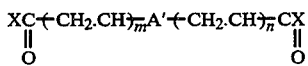

In the above described formula, $A^1$ is represented as follows, and $(m+n)$ is an integer corresponding to the number average molecular weight:

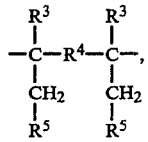

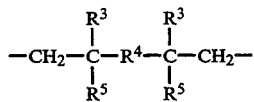

or

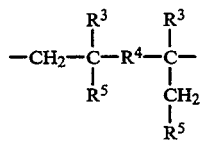

Production of Ethylene Polymer (I')

Ethylene polymer (I') such that X' is a hydrogen atom can be produced by the following method.

Ethylene Is polymerized In the presence of a reaction product of a polymerization catalyst consisting of a vanadium chelate compound and dialkylaluminum dihalide with an ω, ω'-diolefin compound containing 5 to 20 carbon atoms, reacting with the said diolefin compound and then reacting with a proton donor to obtain an ethylene polymer (III) having vinyl groups at both the ends thereof, which is then hydroxylated.

Ethylene polymer (I') such that X' is $-SiR^{1'}_3$ or

can be produced by reacting the above described hydroxylated ethylene polymer with a silane compound represented by the general formula $R^{1'}_3SiY'$ wherein $R^{1'}$ has the same meaning as described above and Y' is a halogen atom or a carboxylic acid represented by the general formula $R^{2'}COOH$ wherein $R^{2'}$ has the same meaning as described above.

(1) Reaction of Polymerization Catalyst with Diolefin Compound

The polymerization catalyst consists of a vanadium chelate compound and a dialkylaluminum halide. The vanadium chelate compound is represented by the following general formula:

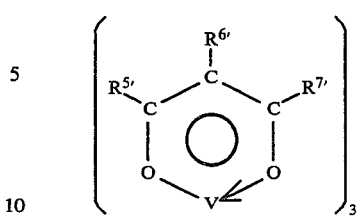

In this general formula, $R^{5'}$ to $R^{7'}$ represent hydrogen atoms or hydrocarbon groups of 1 to 8 carbon atoms, but at least one of $R^{5'}$ to $R^{7'}$ must be hydrogen atom and all of $R^{5'}$ to $R^{7'}$ must not be hydrogen atom.

Specific examples of the compound included in the above described general formula will now be illustrated.

Case where $R^{6'}$ is a hydrogen atom and $R^{5'}$ and $R^{7'}$ are hydrocarbon groups:

$R^{5'}/R^{7'}$: $CH_3/CH_3$, $CH_3/C_2H_5$, $C_2H_5/C_2H_5$, $CH_3/C_6H_5$, $C_2H_5/C_6H_5$, $C_6H_5/C_6H_5$
$CH_3/C_6H_5CH_2$, $C_6H_5CH_2/C_6H_5CH_2$, $C_2H_5/C_6H_5CH_2$, $C_6H_5/C_6H_5CH_2$

Case where $R^{6'}$ is a hydrocarbon group and one of $R^{5'}$ and $R^{7'}$ is a hydrogen atom and the other is a hydrocarbon group:

$R^{6'}/R^{5'}$ or $R^{7'}$: $CH_3/CH_3$, $C_2H_5/CH_3$, $CH_3/C_2H_5$, $C_2H_5/C_2H_5$, $C_6H_5/CH_3$,
$CH_3/C_6H_5$, $C_6H_5/C_2H_5$, $C_2H_5/C_6H_5$, $C_6H_5/C_6H_5$,
$C_6H_5CH_2/CH_3$, $CH_3/C_6H_5CH_2$, $C_6H_5CH_2/C_6H_5CH_2$,
$C_6H_5CH_2/C_2H_5$, $C_2H_5/C_6H_5CH_2$, $C_6H_5CH_2/C_6H_5$, $C_6H_5/C_6H_5CH_2$

Case where $R^{6'}$ is a hydrogen atom and one of $R^{5'}$ and $R^{7'}$ is a hydrogen atom and the other is a hydrocarbon group: $R^{5'}$ or $R^{7'}$: $CH_3$, $C_2H_5$, $C_6H_5$, $C_6H_5CH_2$ Above all, the following compounds are preferable.

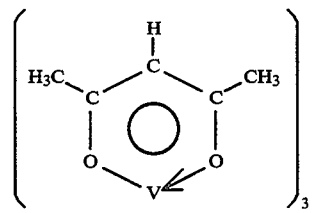

V(acetylacetonato)₃

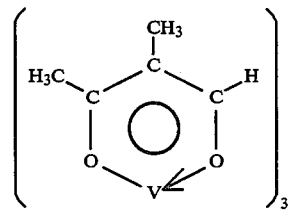

V(2-methyl-1,3-butanedionato)₃

-continued

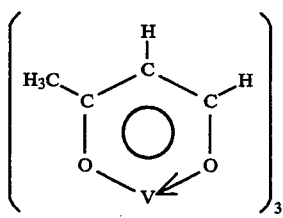

V(1,3-butanedionato)₃

The dialkylaluminum halide is represented by the foregoing general formula $R^{8'}_2AlX$ wherein $R_{8'}$ is an alkyl group of 1 to 20 carbon atoms and X is a halogen atom, examples of which are dimethylaluminum chloride, diethylaluminum chloride, diethylaluminum bromide, diethylaluminum iodide, diisobutylaluminum chloride and the like.

The proportion of tile vanadium chelate compound and dialkylaluminum halide used is generally 1 to 1,000 moles of the dialkylaluminum halide per 1 mole of the vanadium chelate compound.

The $\omega, \omega'$-diolefin compound is represented by the general formula, $H_2C=CH-C_mH_{2m}-CH=CH_2$ where m is 1 to 15.

Examples of the diolefin compound are 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 1,17-octadecadiene and the like.

The reaction of the polymerization catalyst with tile diolefin compound is preferably carried out in a solvent which is inert to the reaction and liquid during the reaction, illustrative of which are hydrocarbons such as propane, butane, pentane, hexane, heptane, toluene, etc.

The reaction is carried out at a temperature of −50° C. or lower, preferably −65° C. or lower for a period of time of 1 minute to 10 hours, preferably 5 minutes to 2 hours. The reaction proportion of the polymerization catalyst and diolefin compound is controlled in such a manner that the vanadium compound in the polymerization catalyst is present in a proportion of 0.1 to 10 moles, preferably 0.5 to 2.0 moles per 1 mole of the diolefin compound.

(2) Polymerization of Ethylene

The polymerization of ethylene is carried out in the presence of the reaction product obtained in the above described (1), preferably by feeding ethylene to the reaction system of the above described (1) and affecting the reaction at a temperature range similar to the above described (1) for a longer time than in the case of the above described (1). When the reaction temperature is adjusted to −65° C. or lower, in particular, there can be obtained a polymer having a $\overline{Mw}$ (weight average molecular weight)/$\overline{Mn}$ (number average molecular weight) of 1.05 to 1.5, near the monodisperse system. Furthermore, the yield and molecular weight of the polymer can be increased by lengthening the polymerization time.

(3) Reaction with Diolefin Compound

The reaction of the reaction product of the above described (2) with the diolefin compound is preferably carried out by feeding the diolefin compound to the reaction system of the above described (2) and effecting the reaction under the similar reaction conditions to those of the above described (1).

(4) Reaction with Proton Donor

As the proton donor, there can be used water, alcohols, inorganic acids, etc. The alcohols include methanol, ethanol, propanol and the like and the inorganic acids include hydrochloric acid, nitric acid, sulfuric acid, and the like. The proton donor functions to release the polymerization catalyst and give proton through action on the ends of the polymer, thereby precipitating the polymer.

The reaction with the proton donor is generally carried out at a temperature of −100° C. to +200° C., preferably 0° to 150° C. for 1 minute to 10 hours, preferably 0.1 to 2 hours. The proton donor is ordinarily used in a largely excessive amount.

Thus, the ethylene polymer (III') having vinyl groups at both the ends thereof of the present invention can be produced and it can be assumed that the polymer (III') has the following microstructure containing the skeleton of the diolefin compound and the alkyl group $R^{8'}$ of the dialkylaluminum halide, used in the production, because of adopting the above described production process.

$$A^{1'}\text{-}(CH_2.CH_2)_n B^{1'}$$

in which $A^{1'}$ and $B^{1'}$ are described below and n is an integer corresponding to the number average molecular weight:

| | $A^{1'}$ | $B^{1'}$ |
|---|---|---|
| ① | H₃C—CH—<br>　　\|<br>　　C_{m'}H_{2m'}<br>　　\|<br>　　H₂C=CH | —CH₂—CH—R^{8'}<br>　　\|<br>　　C_{m'}H_{2m'}<br>　　\|<br>　　CH=CH₂ |
| ② | CH₂—CH₂—<br>　　\|<br>　　C_{m'}H_{2m'}<br>　　\|<br>　　H₂C=CH | —CH₂—CH—R^{8'}<br>　　\|<br>　　C_{m'}H_{2m'}<br>　　\|<br>　　CH=CH₂ |
| ③ | H₃C—CH—<br>　　\|<br>　　C_{m'}H_{2m'}<br>　　\|<br>　　H₂C=CH | —CH—CH₂—R^{8'}<br>　　\|<br>　　C_{m'}H_{2m'}<br>　　\|<br>　　CH=CH₂ |
| ④ | CH₂—CH₂—<br>　　\|<br>　　C_{m'}H_{2m'}<br>　　\|<br>　　H₂C=CH | —CH₂—CH—R^{8'}<br>　　\|<br>　　C_{m'}H_{2m'}<br>　　\|<br>　　CH=CH₂ |
| ⑤ | H₃C—CH—<br>　　\|<br>　　C_{m'}H_{2m'}<br>　　\|<br>　　H₂C=CH | —CH—(CH₂)₃—R^{8'}<br>　　\|<br>　　C_{m'-2}H_{2(m'-2)}<br>　　\|<br>　　CH=CH₂ |
| ⑥ | CH₂—CH₂—<br>　　\|<br>　　C_{m'}H_{2m'}<br>　　\|<br>　　H₂C=CH | —CH—(CH₂)₃—R^{8'}<br>　　\|<br>　　C_{m'-2}H_{2(m'-2)}<br>　　\|<br>　　CH=CH₂ |

(5) Hydroxylation Reaction of Ethylene Polymer (III')

There are the following three methods in the hydroxylation reaction. In a method ⓧ, α-positions at both the ends of the polymer are hydroxylated (—CH- 2—$CH_2$—OH) and in methods 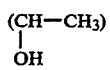and (x̄), β-positions thereof are hydroxylated (—CH—$CH_3$).

$$\underset{OH}{(CH-CH_3)}$$

Method (x̄): The polymer (III') is reacted with diborane and then reacted with an alkali metal hydroxide and hydrogen peroxide.

Method (x̄): The polymer (III') is reacted with sulfuric acid and water.

Method (x̄): The polymer (III') is reacted with mercuric acetate and water and then reacted with sodium borohydride.

Methods (x̄) to (x̄) will now be illustrated in detail.

METHOD (x̄)

The reaction of the polymer (III') with diborane is ordinarily carried out at 100° to 200° C. for 1 minute to 10 hours preferably in the presence of a solvent such as ethers. As the ether, there are preferably used those having a boiling point of at least 100° C., for example, aliphatic ethers such as di-n-butyl ether, di-s-butyl ether, di-n-amyl ether, di-i-amyl ether and the like.

The diborane is ordinarily used in the form of a solution in tetrahydrofuran in a proportion of 0.2 to 100 moles, preferably 0.5 to 20 moles to 1 mole of the whole amount of the diolefin compounds used in the foregoing (1) and (3).

The reaction with an alkali metal hydroxide and hydrogen peroxide is generally carried out at 0° to 100° C. for 1 hour to 1 week. As the alkali metal hydroxide, there are generally used sodium hydroxide and potassium hydroxide, in general, in the form of aqueous solutions. The hydrogen peroxide is ordinarily used as its aqueous solution.

The alkali metal hydroxide and hydrogen peroxide are ordinarily used in excessive amounts, but it is sufficient to use them respectively in an amount of at least equimole to the diborane used above.

Method (x̄)

The reaction of the polymer (III') of with sulfuric acid and water is ordinarily carried out in the presence of water or a mixture of water and ether at 80° to 150° C. for 1 minute to 10 hours.

Method (x̄)

The reaction of the polymer (III') of with mercuric acetate and water is ordinarily carried out in the presence of a mixture of water and ether at 80° to 150° C. for 1 minute to 10 hours.

The reaction of the product obtained in this way with sodium borohydride can be carried out in the similar manner to the above described reaction of mercuric acetate and water.

(6) Reaction with silane compound or carboxylic acid

The silane compound used is represented by the general formula, $R^{1'}_3SiY'$ in which $R^{1'}$ is a hydrocarbon group containing 1 to 5 carbon atoms, preferably methyl or ethyl group and Y' is a halogen atom such as chlorine, bromine, fluorine or iodine.

The carboxylic acid is represented by the general formula, $R^{2'}COOH$ in which $R^{2'}$ is a hydrocarbon group containing 1 to 5 carbon atoms, preferably methyl or ethyl group.

The reaction of the dihydroxypolyethylene obtained in the foregoing (5), with a silane compound or carboxylic acid can be carried out by the commonly used method in the case of trialkylsilylating or esterifying an alcohol.

For example, the reaction with the silane compound is ordinarily carried out initially at 0° to 50° C. for 1 minute to 5 hours and further at 100° to 150° C. for 1 to 10 hours, preferably in tile presence of a solvent such as amine compounds. As the amine compound, there are most preferably used those having a boiling point of at least 100° C., such as pyridine.

The esterification reaction can be conducted with either a carboxylic acid alone or in combination with a small amount of concentrated sulfuric acid or dried hydrogen chloride. Furthermore, a carboxylic halide can be used instead of the carboxylic acid.

The amount of the silane compound or carboxylic acid used is preferably at least 2 times by mole as much as the foregoing ethylene polymer having hydroxyl groups at both the ends thereof.

As described above, the ethylene polymer (I') can be produced.

COMPOUND (II)

The compound (II) is represented by the general formula, YO—R—OY in which R is a divalent hydrocarbon group containing 2 to 20 carbon atoms, preferably a divalent saturated or unsaturated aliphatic hydrocarbon group containing 2 to 12 carbon atoms and Y is a hydrogen atom, —$SiR^8_3$ or

wherein $R^8$ and $R^9$ are hydrocarbon groups each containing 1 to 5 carbon atoms, preferably alkyl group, more preferably methyl and ethyl groups.

Examples of the compound (II) are saturated aliphatic diol compounds such as ethylene glycol, propane diol, butane diol, pentane diol, hexane diol, heptane diol, octane diol and the like and unsaturated aliphatic diol compounds such as butene diol, pentene diol, hexene diol and the like.

In addition, such a compound that the hydrogen atom in the hydroxyl group of the diol compound is substituted by trimethylsilyl group or acetyl group can also be used.

Compound (II')

Compound (II') is represented by the general formula

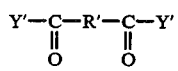

in which R' is a divalent hydrocarbon group containing 1 to 12 carbon atoms, preferably a divalent saturated or unsaturated aliphatic or alicyclic hydrocarbon group containing 1 to 12 carbon atoms and Y' is —OH, —$OR^{3'}$ a halogen atom or —$SO_3R^{4'}$, $R^{3'}$ being a hydrocarbon containing 1 to 5 carbon atoms, preferably an alkyl group, more preferably methyl or ethyl group and $R^{4'}$ being a hydrocarbon group containing 1 to 20 carbon atoms, which can contain a halogen atom, preferably an aryl group or aralkyl group containing 6 to 12 carbon atoms.

Examples of Y' are

—OH, —OCH₃, —OC₂H₅, —O.n-C₃H₇, —O.i-C₃H₇,

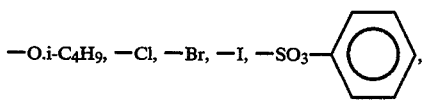

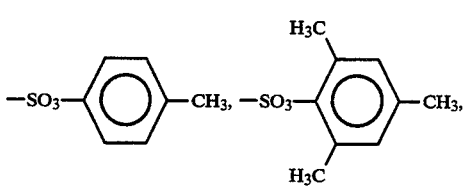

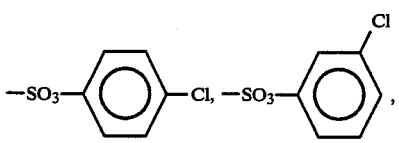

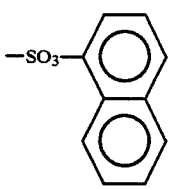

Above all, Y' is preferably —OH, —OCH₃, —OC₂H₅, —Cl or

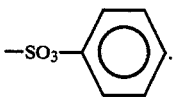

Examples of the compound (II') are saturated aliphatic dicarboxylic acids such as malonic acid, succinic acid, glutaric acid, adipic acid, pimelic acid, suberic acid, azelaic acid, sebacic acid, nonanedicarboxylic acid, decanedicarboxylic acid, dodecanedicarboxylic acid and the like; unsaturated aliphatic dicarboxylic acids such as fumaric acid, maleic acid, citraconic acid, itaconic acid, mesaconic acid, 1,4-butenedicarboxylic acid and the like; saturated alicyclic dicarboxylic acids such as cyclohexanedicarboxylic acid, camphoric acid and the like; dialkyl esters of the above described dicarboxylic acids such as dimethyl esters, diethyl esters, di-n-propylesters, di-i-butyl esters and the like; and dihalides of the above described dicarboxylic acids such as dichlorides, dibromides and the like.

Polycondensation of Ethylene polymer (I) or (I') with Compound (II) or (II')

The polycondensation reaction of the ethylene polymer (I) or (I') respectively with the compound (II) or (II') is ordinarily carried out in the presence of a solvent. As the solvent, it is preferable to use a hydrocarbon, preferably an aromatic hydrocarbon having a boiling point of 80° C. or higher, such as toluene, xylene, etc.

The reaction is generally carried out at 50° to 250° C., preferably 100° to 200° C., for 1 to 100 hours, preferably 5 to 50 hours. Particularly, it is desirable to effect the reaction under reduced pressure at 150° to 200° C. after removing the solvent.

In the polycondensation reaction, furthermore, it is possible to use titanium tetraalkoxides such as titanium tetrapropoxide, titanium tetrabutoxide, titanium tetrahexyloxide, etc. as a catalyst so as to promote the reaction. In order to trap the byproduced products, trapping agents can be used, for example, amines.

In addition, ammonium salts such as benzyltriethylammonium chloride, etc. can be used as a reaction promoter, in particular, in the case of the polycondensation of the polymer (I') with the compound (II').

In the polycondensation reaction, furthermore, the molecular weight of the ethylene polymer according to the present invention can ordinarily be increased by raising the reaction temperature, lengthening the reaction time or using a catalyst.

According to the process of the present invention, an ethylene polymer degradable by microorganisms can effectively be produced.

The following examples are given in order to illustrate the present invention in detail without limiting the same.

EXAMPLE 1 a) Synthesis of Ethylene Polymer (I)

3 millimols of 2,7-di(4-toluyl)-1,7-octadiene was dissolved in 25 ml of a mixed solution of same volumes of heptane and toluene to prepare a solution. This solution was added to 9 millimols of s-butyllithium and stirred at room temperature for 5 days. A dilithio compound, precipitated from the reaction solution, was filtered and washed with 25 ml of heptane.

200 ml of dried toluene was charged in a reaction vessel of 500 ml, adequately replaced by nitrogen, to which 7 millimols of tetramethylethylenediamine was further added. After cooling to 0° C., the above described dilithio compound was introduced thereinto and ethylene was added thereto with stirring. The stirring was continued for 24 hours while supplementing ethylene to the system so that the pressure of ethylene be maintained at 2 atm and an ethylene polymer was thus synthesized.

After evacuating the system to remove the residual ethylene monomer, the system was cooled at −78° C., into which dried carbon dioxide was introduced. While maintaining the inner pressure of carbon dioxide at 2 atm, the reaction system was heated to room temperature and stirred for further 5 hours.

The product was poured in 10% hydrochloric acid and the formed precipitate was subjected to filtration. The precipitate was extracted with hot toluene for 2 days, the toluene was cooled and the formed solid was separated by filtration and then dried. A polymer was obtained with a yield of 1.6 g and had a number average molecular weight ($\overline{Mn}$) of $1.5 \times 10^3$ measured by GPC.

When the IR spectrum was measured, a peak due to carboxylic acid was observed at 1700 cm$^{-1}$. When the proton NMR was measured, a broad peak due to the hydrogen of the carboxylic acid was observed near 11 ppm.

The number average molecular weight was sought from the intensity ratio of the peak at 1.3 ppm due to the ethylene polymer and the peak at 2.3 ppm due to the hydrogen of the methylene group adjacent to the carboxylic acid to give an $\overline{Mn}$ of $1.7 \times 10^3$. This was well In agreement with the value obtained by GPC.

15

Thus, it was concluded that an ethylene having carboxyl groups at both the ends thereof was synthesized.

1.5 g of the thus obtained ethylene polymer (I) having carboxyl groups at both the ends was dissolved in 200 ml of xylene at 120° C., to which 8.3 ml of boron trifluoride-methanol complex was added. The mixture was reacted while heating and refluxing for 6 hours, after which the solvent was removed under reduced pressure to obtain an object product.

Measurement of IR spectrum told peaks due to the ester bond near 1740 cm$^{-1}$ and 1150 cm$^{-1}$.

Thus, it was concluded that the both ends-carboxylated ethylene polymer (I) was converted into the both ends-methyl esterified ethylene polymer (I).

b) Polycondensation with 1,8-Octanediol Diacetate 1.5 g of the above described both ends-carboxylated ethylene polymer (I) and 1 millimol of 1,8-octanediol diacetate were mixed, heated at 180° C. and melted.

This melted mixture was reacted at a reduced pressure of 2 mmHg and the same temperature for 36 hours and the temperature was lowered to room temperature to obtain a solid polymer. Then, this polymer was dissolved in toluene and washed with methanol repeatedly, thus obtaining an ethylene polymer of the present invention.

When the IR spectrum of this polymer was measured, a peak (1700 cm$^{-1}$) due to the carboxylic group disappeared and peaks due to the ester bond were newly observed near 1740 cm$^{31\ 1}$ and 1150 cm$^{31\ 1}$.

The $\overline{Mn}$ obtained by GPC was $4.8 \times 10^3$.

From the above described results, it was concluded that the resulting ethylene polymer was a polymer consisting of the following recurring units:

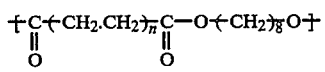

EXAMPLE 2 a) Synthesis of Ethylene Polymer (I)

The both ends-methylesterified ethylene polymer (I) was synthesized in an analogous manner to Example 1.

b) Polycondensation with Ethylene Glycol 1.5 g of the ethylene polymer (I) obtained as described above and 0.06 ml of ethylene glycol were mixed and dissolved in 40 ml of toluene with refluxing. One drop of titanium tetrabutoxide was then added to this solution and reacted for 1 hour while toluene-refluxing under nitrogen gas stream. The mixed solution, cooled to room temperature, was poured in methanol to obtain a precipitate. One drop of titanium tetrabutoxide was added to this precipitate and processed for 8 hours at 180° C. at a reduced pressure of 4 mmHg. Then, the temperature was lowered to room temperature to obtain a solid ethylene polymer.

The $\overline{Mn}$ obtained by GPC was $6 \times 10^3$.

From the above described results, it was concluded that the resulting ethylene polymer was a polymer consisting of the following recurring units:

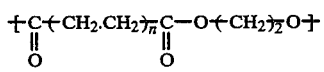

16

EXAMPLE 3 a) Synthesis of Ethylene Polymer (I)

The polymerization of ethylene was carried out in an analogous manner to Example 1 except changing the toluene used as a solvent in the polymerization of ethylene in xylene and the polymerization time in 48 hours. A part of the resulting polymer was taken and subjected to measurement of $\overline{Mn}$ by GPC to obtain an $\overline{Mn}$ of $2.8 \times 10^3$.

The polymer was then reacted with carbon dioxide in an analogous manner to Example 1. After exhausting the carbon dioxide, a solution of 6 millimols of benzenesulfonyl chloride dissolved in 60 ml of xylene was added to the reaction solution and stirred at 120° C. for 30 minutes. The resulting mixture was hot-filtered, further heated and concentrated until the amount of the solution was approximately 30 ml.

b) Polycondensation with 1,4-Butanediol

To the concentrated solution were added a solution of 1.5 millimoles of 1,4-butanediol dissolved in 3 ml of xylene and further 1.5 millimoles of tetramethylethylenediamine. This mixed solution was reacted at 120° C. for 24 hours and the temperature was lowered to room temperature, methanol was added thereto to precipitate a product. The polymer was obtained with a yield of 3.1 g and had a number average molecular weight of $1.0 \times 10^4$. In the IR spectrum of the polymer, there was hardly found a peak due to the carboxylic acid and an absorption due to the ester bond was observed in the vicinity of 1740 cm$^{31\ 1}$.

From the above described results, it was concluded that the resulting ethylene polymer was a polymer consisting of the following recurring units:

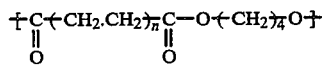

EXAMPLE 4 a) Synthesis of Ethylene Polymer (I')

1000 ml of toluene was charged in a flask of 3000 ml, sufficiently replaced by nitrogen gas, and then cooled at −65° C., to which 1.2 millimoles of 1,7-octadiene was added at the same temperature. 10 millimoles of Al(C$_2$H$_5$)$_2$Cl and 1 millimole of V(2-methyl-1,3-butanedionato)$_3$ were then added thereto and stirred for 30 minutes. Further, 4.5 g of ethylene was introduced thereinto for 2 hours and 1.2 millimoles of 1,7-octadiene was then added thereto. After stirring for 10 minutes, the reaction solution was poured in ethanol and filtered to obtain a polymer having a number average molecular weight ($\overline{Mn}$) of $4.9 \times 10^3$ measured by the GPC method with a yield of 4.3 g.

Measurement of the proton NMR of the above described polymer told a signal based on the proton of the terminal double bonds at 5.0 ppm and 5.8 ppm. The assignments thereof are as follows:

| δ (ppm) | Assignment | δ (ppm) | Assignment |
| --- | --- | --- | --- |
| 5.0 | —CH=CH$_2$ | 5.8 | —C$\underline{H}$=CH$_2$ |

From the intensity ratio of this signal and the peak of 1.3 ppm due to the ethylene polymer was obtained $\overline{Mn}$ of 4.6×10³ assuming that vinyl groups were present at both the ends thereof. This value was substantially in agreement with that obtained by the GPC method. It was concluded therefrom that the thus obtained polymer was an ethylene polymer having vinyl groups at both ends thereof.

The above described polymer was added to 200 ml of n-butyl ether, to which a solution of diborane in tetrahydrofuran was added at room temperature while vigorously stirring and flowing nitrogen. The amount of the diborane added was 2.5 millimoles. After stirring for 1 hour at the refluxing temperature, the temperature was lowered and 200 ml of a 3N aqueous solution of sodium hydroxide and 200 ml of a 30% aqueous solution of hydrogen peroxide were added thereto, followed by stirring for 1 day. The resulting polymer was adequately washed with water, then washed with acetone and dried.

There was found a broad peak at 3300 to 3500 cm³¹ ¹ in the IR (infrared absorption spectrum) chart of the thus formed polymer, from which it was concluded that the resulting polymer was an ethylene polymer (I') having hydroxy groups at both the ends thereof.

b) Polycondensation with Adipic Dichloride

The ethylene polymer (I') obtained as described above and 1 millimole of adipic dichloride were dissolved in 20 ml of toluene at 120° C. To this solution was dropwise added 1 millimole of tetramethylethylenediamine and the mixture was reacted at 120° C. for 24 hours. After removing the byproduct by hot-filtration, the reaction mixture was cooled to room temperature and the precipitated polymer was recovered.

When this polymer was subjected to measurement of the IR spectrum, a peak due to the hydroxyl group was not found, but there was found an absorption peak due to the ester group at 1740 cm⁻¹. The polymer had an $\overline{Mn}$ of 2.0×10⁴ obtained by GPC.

From the above described results, it was concluded that the resulting ethylene polymer was a polymer consisting of the following recurring units:

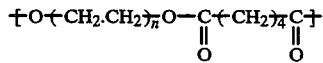

EXAMPLE 5 a) Synthesis of Ethylene Polymer (I')

Example 4 was repeated except introducing 1.5 g of ethylene for 30 minutes, thus synthesizing an ethylene polymer (I') having hydroxyl groups at both the ends thereof and an $\overline{Mn}$ of 1.2×10³ measured by GPC.

b) Polycondensation with Succinic Acid Diethyl Ester 1.2 g of the ethylene polymer (I') obtained as described above and 1 millimole of diethyl succinate were mixed, to which one drop of titanium tetrabutoxide was then added, and the mixture was reacted at 180° C. for 1 hour in a nitrogen gas flow. Further, the mixture was treated at 180° C. and a reduced pressure of 2 mmHg for 6 hours and then the temperature was lowered to room temperature to obtain a solid ethylene polymer.

When this polymer was subjected to measurement or the IR spectrum, there was found no absorption peak due to the hydroxyl group. The polymer had an $\overline{Mn}$ of 5.0×10³.

From the above described results, it was concluded that the resulting ethylene polymer was a polymer consisting of the following recurring units:

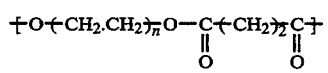

EXAMPLE 6 a) Synthesis of Ethylene Polymer (I')

1000 ml of toluene was charged in a flask of 3000 ml, sufficiently replaced by nitrogen gas, and then cooled at −78° C., to which 0.6 millimole of 1,9-decadiene was added at the same temperature. 100 millimoles of Al(C₂H₅)₂Cl and 20 millimoles of V(acetylacetonato)₃ were then added thereto and stirred for 30 minutes. Further, 1.5 g of ethylene was introduced thereinto for 30 minutes and 0.6 millimole of 1,9-decadiene was then added thereto. After stirring for 30 minutes, the reaction solution was poured in ethanol and filtered to obtain a polymer having a number average molecular weight ($\overline{Mn}$) of 2.6×10³ measured by the GPC method with a yield of 1.2 g.

Then, the procedure of Example 4 was repeated except using 1 millimole of diborane to synthesize a both ends-hydroxylated ethylene polymer (I').

The ethylene polymer (I') and 10 g of trimethylchlorosilane were added to 250 ml of pyridine, stirred at 25° C. for 1 hour and then reacted for 4 hours under refluxing the pyridine. The resulting polymer was washed with methanol and then dried.

Measurement of the proton NMR of the above described polymer told a signal based on the proton due to the proton of —Si(CH₃)₃ at δ=0.08 ppm. As a result of the IR analysis, an absorption spectrum of the hydroxyl group was not observed. Thus, it was concluded that the resulting polymer was an ethylene polymer (I') having trimethylsilyloxy groups at both the ends thereof.

b) Polycondensation with Succinyl Dichloride 1.3 g of the both ends-trimethylsilylhydroxylated ethylene polymer (I'), 0.5 millimole of succinyl dichloride and 10 mg of benzyltriethylammonium chloride were reacted at 150° C. until generation of trimethylsilane chloride was not confirmed and then further reacted at 180° C. for 1 hour. The temperature was lowered to room temperature to obtain a solid ethylene polymer.

When this polymer was subjected to measurement of the IR spectrum, an absorption spectrum due to the ester group was found in the vicinity of 1740 cm⁻¹ and 1150 cm⁻¹. The polymer had an $\overline{Mn}$ of 1.5×10⁴ obtained by GPC.

From the above described results, it was concluded that the resulting ethylene polymer was a polymer consisting of the following recurring units:

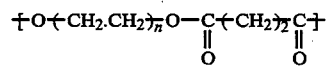

What is claimed is:

1. A process for the preparation of an ethylene polymer comprising a recurring unit represented by the formula

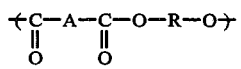

in which R is a divalent hydrocarbon group containing 2 to 20 carbon atoms and A is a polyethylene segment comprising a recurring unit represented by the formula —$CH_2.CH_2$— and having a number average molecular weight ($\overline{Mn}$) of 300 to 300,000, and the ethylene polymer having a number average molecular weight ($\overline{Mn}$) of 500 to 5,000,000 which comprises the polycondensation of an ethylene polymer (I) comprising a recurring unit represented by —(-$CH_2.CH_2$-)— and having

at both the ends and an Mn of 300 to 300,000 with a compound (II) represented by the formula YO—R—OY, in which X is —OH or —OR$^1$, Y is a hydrogen atom or

R$^1$ is a hydrocarbon group containing 1 to 5 carbon atoms, R$^4$ is a hydrocarbon containing 1 to 5 carbon atoms, and R has the same meaning as described above, the polycondensation being carried out at 50° to 250° C. for 1 hour to 100 hours and in the presence of a catalyst selected from the group consisting of titanium-tetrapropoxide, titaniumtetrabutoxide and titaniumtetrahexyloxide.

2. A process for the preparation of an ethylene polymer comprising a recurring unit represented by the formula

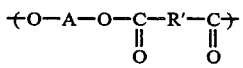

in which R' is a divalent hydrocarbon group containing 1 to 20 carbon atoms and A is a polyethylene segment comprising a recurring unit represented by the formula —$CH_2.CH_2$— and having a number average molecular weight ($\overline{Mn}$) of 300 to 300,000, and the ethylene polymer having a number average molecular weight ($\overline{Mn}$) of 500 to 5,000,000 which comprises the polycondensation of an ethylene polymer (I') comprising a recurring unit represented by —$CH_2.CH_2$— and having X'O- group at both the ends and an Mn of 300 to 300,000 with a compound (II') represented by the formula

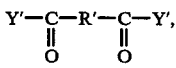

in which X' is a hydrogen atom or SiR$^{1'}{}_3$, Y' is —OR$^{3'}$ or a halogen atom, R$^{1'}$, and R$^{3'}$ are hydrocarbon groups each containing 1 to 5 carbon atoms, and R' has the same meaning as described above, the polycondensation being carried out at 50° to 250° C. for 1 hour to 100 hours and in the presence of a catalyst selected from the group consisting of titanium-tetrapropoxide, titaniumtetrabutoxide and titaniumtetrahexyloxide.

3. The process as claimed in claim 1, wherein the ethylene polymer (I) in which X is —OH in

is produced by polymerizing ethylene in the presence of a dilithio compound formed by reaction of a diolefin compound (III) represented by the formula, $H_2C\!=\!CR^3$—$R^4$—$CR^3\!=\!CH_2$ wherein R$^3$ is a hydrocarbon group containing 1 to 10 carbon atoms and R$^4$ is a divalent hydrocarbon group containing 1 to 20 carbon atoms, with an organolithium compound (IV), and a diamine compound (V), then reacting with carbon dioxide, and further reacting with a proton donor.

4. The process as claimed in claim 1, wherein the ethylene polymer (I) in which X is —OR$^1$ in

is produced by polymerizing ethylene in the presence of a dilithio compound formed by reaction of a diolefin compound (III) represented by the formula, $H_2C\!=\!CR^3$—$R^4$—$CR^3\!=\!CH_2$ wherein R$^3$ is a hydrocarbon group containing 1 to 10 carbon atoms and R$^4$ is a divalent hydrocarbon group containing 1 to 20 carbon atoms, with an organolithium compound (IV), and a diamine compound (V), then reacting with carbon dioxide, further reacting with a proton donor and then reacting with an alcohol represented by R$^1$OH wherein R$^1$ is a hydrocarbon group containing 1 to 5 carbon atoms.

5. The process as claimed in claim 3 or 4, wherein the reaction of the diolefin compound (III) with the organolithium compound (IV) is carried out in the presence of an organic solvent.

6. The process as claimed in claim 3 or 4, wherein the compound (IV) to the compound (III) molar ratio is in the range of 0.1 to 30.

7. The process as claimed in claim 3 or 4, wherein the diamine compound (V) is represented by the formula R$^6{}_2$N—R$^7$—N R$^6{}_2$ wherein R$^6$ is a hydrocarbon group containing 1 to 5 carbon atoms and R$^7$ is a divalent hydrocarbon group containing 1 to 10 carbon atoms.

8. The process as claimed in claim 3 or 4, wherein the diamine compound (V) is used in a proportion of 0.1 to 20 moles to 1 mole of the diolefin compound (III).

9. The process as claimed in claim 3 or 4, wherein the proton donor is at least one member selected from the group contrasting of water, methanol, ethanol, propanol, hydrochloric acid, nitric acid and sulfuric acid.

10. The process as claimed in claim 1, wherein the polycondensation of the ethylene polymer (I) with the compound (II) is carried out in the presence of a solvent.

11. The process as claimed in claim 2, wherein the ethylene polymer (I') in which X' in X'O— is a hydrogen atom is produced by polymerizing ethylene in the presence of a reaction product of a polymerization catalyst consisting of a vanadium chelate compound and dialkylaluminum halide, and an ω,ω'-diolefin compound containing 5 to 20 carbon atoms, reacting with the diolefin compound, then reacting with a proton donor and hydroxylating the resulting ethylene polymer (III') having vinyl groups at both the ends thereof.

12. The process as claimed in claim 2, wherein the ethylene polymer (I') in which X' in X'O— is —SiR$^{1'}_3$ wherein R$^{1'}$ is a hydrocarbon group containing 1 to 5 carbon atoms is produced by polymerizing ethylene in the presence of a reaction product of a polymerization catalyst consisting of a vanadium chelate compound and dialkylaluminum halide, and a ω,ω'-diolefin compound containing 5 to 20 carbon atoms, reacting with the diolefin compound, then reacting with a proton donor, hydroxylating the resulting ethylene polymer (III') having vinyl groups at both the ends thereof and reacting the hydroxylated ethylene polymer with a silane compound represented by R$^{1'}_3$SiY' wherein R$^{1'}$ has the same meaning as described above and Y' is a halogen atom.

13. The process as claimed in claim 11 or 12, wherein the vanadium chelate compound and dialkylaluminum halide are present in a proportion of 1 to 1000 moles of the dialkylaluminum halide to 1 mole of the vanadium chelate compound.

14. The process as claimed in claim 11 or 12, wherein the ω,ω'-diolefin compound is represented by the formula H$_2$C=CH (—C$_m$H$_{2m}$—) CH—CH$_2$ wherein m is 1 to 15.

15. The process as claimed in claim 11 or 12, wherein the reaction of the polymerization catalyst and diolefin compound is carried out in the presence of a solvent.

16. The process as claimed in claim 11 or 12, wherein the reaction ratio of the polymerization catalyst and diolefin compound is so adjusted that the vanadium compound in the polymerization catalyst is in a proportion of 0.1 to 10 moles per 1 mole of the diolefin compound.

17. The process as claimed in claim 11 or 12, wherein the proton donor is at least one member selected from the group consisting of water, methanol, ethanol, propanol, hydrochloric acid, nitric acid and sulfuric acid.

18. The process as claimed in claim 11 or 12, wherein the hydroxylation of the ethylene polymer (III') is carried out by reacting the ethylene polymer (III') with diborane and then reacting with an alkali metal hydroxide and hydrogen peroxide.

19. The process as claimed in claim 11 or 12, wherein the hydroxylation of the ethylene polymer (III') is carried out by reacting the ethylene polymer (III') with sulfuric acid and water.

20. The process as claimed in claim 11 or 12, wherein the hydroxylation of the ethylene polymer (III') is carried out by reacting the ethylene polymer (III') with mercuric acetate and water and then reacting with sodium borohydride.

21. The process as claimed in claim 2, wherein the polycondensation of the ethylene polymer (I') with the compound (II') is carried out in the presence of a solvent.

* * * * *